Patented May 16, 1950

2,507,560

UNITED STATES PATENT OFFICE 2,507,560

PROCESS FOR BREAKING PETROLEUM EMULSIONS

Melvin De Groote, St. Louis, and Bernhard Keiser, Webster Groves, Mo., assignors to Petrolite Corporation, Ltd., Wilmington, Del., a corporation of Delaware No Drawing. Application February 15, 1949, Serial No. 76,654

5 Claims. (Cl. 252—335)

This application is a continuation-in-part of our copending application, Serial No. 21,754, filed April 17, 1948, now Patent 2,500,349, which in turn is a continuation-in-part of our application Serial No. 734,205, filed March 12, 1947, now abandoned.

This invention relates to petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

One object of our invention is to provide a novel process for breaking or resolving emulsions of the kind referred to.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities particularly inorganic salts from pipeline oil.

Demulsification, as contemplated in the present application, includes the preventive step of commingling the demulsifier with the aqueous component which would or might subsequently become either phase of the emulsion, in absence of such precautionary measure. Similarly, such demulsifier may be mixed with the hydrocarbon component.

The demulsifying agent employed in the present process is the hydrophile oxyalkylated derivative of on artificial wax consisting essentially of the reaction product of stearic acid, maleic anhydride and a polyhydric alcohol selected from the group consisting of pentaerythritol, polypentaerythritols and mixtures thereof, in which the polyhydric alcohol is substantially completely esterified by the acids in the proportion of approximately 0.75 equivalent of stearic acid and approximately 0.25 equivalent of maleic anhydride for each equivalent of the polyhydric alcohol. See United States Patent No. 2,427,255, dated September 9, 1947, to Burrell et al.

The chemical compound or compounds herein contemplated as demulsifying agents, can be obtained or produced by any suitable process. After the artificial wax has been prepared, it may be subjected to oxyalkylation, particularly oxyethylation, in the manner employed for oxyalkylating alcohols or partial esters. The procedure just described is old and simply involves treatment of the reactant with a suitable alkylene oxide, preferably in presence of an alkaline catalyst, for approximately two to ten hours, the temperatures varying up to 175° C., and the pressure varying from 25 to 300 pounds per square inch.

The alkylene oxide which we use is preferably one having not over four carbon atoms, and particularly ethylene oxide, propylene oxide, butylene oxide, glycide, methylglycide, or the chloro derivatives which are the equivalent of the oxides.

In preparing the demulsifying agent employed in accordance with the method of the present invention, we react with the artificial wax sufficient oxyalkylating agent to produce distinct hydrophile properties, as indicated by self-emulsifiability, and preferably distinct hydrophile properties, as shown by giving a perfectly clear and transparent appearance in water in dilute solution, for instance one to three.

As to the pentaerythritol compounds employed, reference is made to United States Patent No. 2,356,745, dated August 29, 1944, to Barth et al. The following is a verbatim excerpt as it appears in said patent.

In the manufacture of pentaerythritol by the condensation of acetaldehyde and formaldehyde, in addition to the pentaerythritol itself, smaller amounts of related hydroxylated substances are also obtained. One of these obtained in a considerable amount is dipentaerythritol, which is an ether of the following structure:

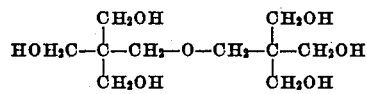

(See Brun, "Uber den Dipentaerythritol," Wilhelm Greven, Krefeld, 1930.) Another related hydroxylated substance, obtained in somewhat smaller amounts, is white and crystalline, melts at 230–240° C. and has a hydroxyl content of 33%. It is related to dipentaerythritol in that it contains pentaerythritol residues bound by ether linkages. Regardless of chemical structure, for purposes of definition in this specification and in the claims, this substance will be termed pleopentaerythritol.

According to the best evidence available, pleopentaerythritol is probably a mixture of dipentaerythritol, tripentaerythritol, and possibly additional related alcohols.

Dipentaerythritol, tripentaerythritol, and pleopentaerythritol may be grouped together under the generic term "polypentaerythritols," by which term is meant those compounds of higher molecular weight than pentaerythritol which are formed either actually or theoretically by etherifying one or more of the hydroxyl groups of pentaerythritol with other pentaerythritol residues.

The normal esters of pentaerythritol and the polypentaerythritols may be formed by using methods long known in the art, such as heating them with acids or anhydrides, with or without a catalyst, under conditions favorable to the removal of water. As to other patents relating to the esterification of pentaerythritol and similar products, reference is made to United States Patent No. 2,360,393, dated October 17, 1944, to Burrell; United States Patent No. 2,360,394, dated October 17, 1944, to Burrell; United States Patent No. 2,340,043, dated January 25, 1944, to Clare; and British Patent No. 405,826, dated February 15, 1934, to E. I. du Pont de Nemours & Company.

ESTER

Example 1

1,000 parts of stearic acid, approximately 3.5 moles, 168 parts of technical pentaerythritol ("Pentek," containing 85% monopentaerythritol and 15% dipentaerythritol, which is approximately 4.7 equivalents) and 10 parts of calcium naphthenate were heated with constant agitation under an atmosphere of carbon dioxide to a temperature of 250° C., and held at this temperature 1.25 hours. The reaction mixture was cooled to 150° C., and 58 parts maleic anhydride (approximately 0.59 mole) were added. The temperature was again raised to 250° C. and held at 245–250° C. for four hours, with constant agitation, under a carbon dioxide atmosphere. (See Example 1 of aforementioned United States Patent No. 2,427,255).

ESTER

Example 2

An ester having the same stoichiometric proportions as in Example 1, immediately preceding, was prepared, using technical dipentaerythritol having an equivalent weight of 42.5. Thus 42.5 parts of the dipentaerythritol (approximately 1 equivalent) and 214 parts of stearic acid (0.75 equivalent) were heated together up to 241° C. over a period of 40 minutes. The product was cooled to 124° C. and 12.2 parts of maleic anhydride (approximately 0.124 mole) were added. The resulting reaction mixture was heated at 245°–260° C. for five hours. (See example 6 of the aforementioned United States Patent No. 2,427,255). The reaction flask was swept out with carbon dioxide during the entire reaction period.

ESTER

Example 3

| | Grams |
|---|---|
| Stearic acid (0.70 mole) | 200 |
| Technical pentaerythritol as in Example 1 preceding (0.94 equivalent) | 33.6 |
| Calcium naphthenate | 2 |

The above ingredients were heated to 250° C. and this temperature maintained for 1¼ hours. The mixture was stirred constantly during the heating period. Water began to come off at a temperature of 192° C. and during the course of heating 11 cc. of water were eliminated. After maintaining the temperature of 250° C. for the time above indicated (1¼ hours) the mass was allowed to come to 150° C. and maleic anhydride (0.18 mole) in an amount equal to 11.6 grams was then added. The temperature was then raised to 250° C. and maintained for four hours with constant stirring. A slight "bumping" was noted during the addition of the maleic anhydride, but this ceased without the evolution of any water. The resultant product was a hard, waxlike solid, comparable to the ester previously described in Example 1. Since this reaction was conducted without the use of carbon dioxide, the product was slightly darker in color, but not appreciably so.

ESTER

Example 4

| | Grams |
|---|---|
| Stearic acid (0.745 mole) | 212 |
| Dipentaerythritol (1.0 mole) equivalent | 42.5 |

The above ingredients were added to a reaction flask equipped with a stirrer, and heated to 240° C. for 40 minutes. Constant stirring was employed during the entire period. During this period of time 8 cc. of water was evolved. Considerable "bumping" took place during the evolution of water. The reaction mass was then cooled to 124° C. and maleic anhydride (0.124 mole) equivalent to 12.2 grams was added. The mixture was then heated to 245°–250° C. for five hours. No more water was evolved. The final product was a hard, waxlike solid, comparable in appearance to the ester described in Example 2, preceding, except that it was somewhat darker in color, having a greyish cast.

Using the procedure described above and more particularly described in our aforementioned application, Serial No. 21,754, samples of the esters of the preceding examples were reacted with ethylene oxide in an autoclave equipped with a stirrer, sodium methylate in powdered form being used as a reaction catalyst. In performing the reaction, the ester was dissolved in xylene and the catalyst was thereafter added. The mixture was placed in the autoclave, after which the ethylene oxide was added, the autoclave was closed, the stirring device was started and the contents were heated until the developed pressure dropped to practically nothing. Upon cooling, another portion of the ethylene oxide was added and the heating procedure repeated.

OXYALKYLATED ESTER

Example 1

In this example, 210.0 grams of the ester of Example 3 preceding, 209.0 grams of xylene, 5.5 grams of sodium methylate and 150 grams of ethylene oxide were used in the first stage of oxyethylation. The reaction time was 3.0 hours, the maximum temperature reached as 160° C. and the maximum gauge pressure attained was 200 lbs. per square inch. The product was an amber liquid which emulsified in water.

This product was subjected to a second stage of oxyethylation using 150 grams of ethylene oxide. The reaction time was 1.0 hour, the maximum temperature reached during the reaction was 165° C. and the maximum gauge pressure attained during the reaction was 210 lbs. per square inch. The product was an amber liquid which emulsified easily in water and was incipiently soluble therein.

This product was subjected to a third stage of oxyethylation using 150 grams of ethylene oxide. The reaction required 0.5 hour, the maximum temperature reached during the reaction being 150° C. and the maximum gauge pressure attained being 190 lbs. per square inch. The product was an amber liquid which dissolved in water to form a somewhat turbid solution.

OXYALKYLATED ESTER

Example 2

In this example, 206.0 grams of the ester of Example 4 preceding, 203.0 grams of xylene, 5.5 grams of sodium methylate and 150 grams of ethylene oxide were used in the first stage of oxyethylation. The reaction time was 2.5 hours, the maximum temperature reached was 155° C. and the maximum gauge pressure attained was 190 lbs. per square inch. The product was an amber liquid which emulsified in water.

This product was subjected to a second stage of oxyethylation using 150 grams of ethylene oxide. The reaction time was 2.0 hours, the maximum temperature reached during the reaction was 150° C. and the maximum gauge pressure attained during the reaction was 210 lbs. per square inch. The product was an amber liquid which emulsified easily in water and was incipiently soluble therein.

This product was subjected to a third stage of oxyethylation using 150 grams of ethylene oxide. The reaction required 1.35 hours, the maximum temperature reached during the reaction being 145° C. and the maximum gauge pressure attained being 200 lbs. per square inch. The product was an amber liquid which dissolved in water to form a clear solution.

Entirely aside from the above procedure, it is desirable to emphasize at this point that the exact ratios above indicated do not have to be followed, but may be varied so as to give a series of oxyethylated products, if desired. Furthermore, the solvent employed, for instance, xylene, may be eliminated by evaporation or distillation, including vacuum distillation, so as to yield the solvent-free product.

The time of addition of the oxyalkylating agent is immaterial provided the reaction is completed. We have found that the time noted for addition of ethylene oxide can be varied by speeding up the stirring device or ethylene oxide may be added continuously. The addition of ethylene oxide can also be speeded up by adding a bit more catalyst, for instance, twice as much as was employed in the above experiments, or perhaps using somewhat higher temperatures, for instance, temperatures of 175° C. or thereabouts. These are simply obvious variations and they are immaterial in regard to the nature of the final product, provided one ultimately causes the predetermined amount of ethylene oxide or other oxyalkylating agent to combine per mole unit or weight unit of the artificial wax.

Incidentally, as far as a solvent goes, we have found that any other comparable aromatic solvent is just as satisfactory, for instance, toluene or cymene, or any other solvents mentioned elsewhere. Here again, the solvent is absolutely immaterial, provided it is a solvent for the reaction mass.

It is to be noted that glycide should be employed with extreme care, due to the danger of a spontaneous explosion or detonation. Methylglycide requires equally careful handling. Reactions of a similar nature can often be conducted with less hazard by using epichlorohydrin. See German Patent No. 670,419, dated January 18, 1939. However, we have found that for the present purpose the derivatives obtained from ethylene oxide appear to be particularly satisfactory and there is no obvious advantage in employing a reactant involving enhanced hazard. As to the preparation of glycide (glycidol) see J. Am. Chem. Soc. 52, 1521 (1940).

Conventional demulsifying agents employed in the treatment of oil field emulsions, are used, as such or after dilution with any suitable solvent, such as water and petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process, may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil and water-solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously, and at somewhat lower cost than is possible with other available demulsifiers, or conventional mixtures thereof. It is believed that the particular demulsifying agent or treating agent herein described will find comparatively limited application, so far as the majority of oil field emulsions are concerned, but we have found that such a demulsifying agent has commercial value, as it will economically break or resolve oil field emulsions in a number of cases which cannot be treated as easily or at so low a cost with the demulsifying agents heretofore available.

In practicing our process for resolving petroleum emulsions of the water-in-oil type, a treating agent or demulsifying agent of the kind above described, is brought into contact with or caused to act upon the emulsion to be treated, in any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible when the demulsifier is used in connection with acidification of calcareous oil-bearing strata, especially if suspended in or dissolved in the acid employed for acidification.

A somewhat analogous use of our demulsifying agent is in the removal of a residual mud sheath which remains after drilling a well by the rotary method. See United States Patent No. 2,135,589, dated November 8, 1938, to Monson. Sometimes the drilling mud contains added calcium carbonate or the like to render the mud susceptible to reaction with hydrochloric acid or the like, and thus expedite its removal. Our compound is particularly adapted for use in connection with such treatment involving the use of strong mineral acid.

One preferred and more narrow aspect of our invention, insofar as it is concerned with demulsification of petroleum emulsions of the water-in-oil type, is concerned with the admixture of the hydrophile hydroxypolyalkoxy compound herein described, with a viscosity-reducing solvent such as the various solvents enumerated, particularly aromatic solvents, alcohols, ether alcohols, etc., as previously specified. The word "solvent" is used in this sense to refer to the mixture, if more than one solvent is employed, and generally speaking, it is our preference to employ the demulsifier in a form representing 25% to 85% demulsifier and 15% to 75% solvent, largely, if not entirely, non-aqueous and so selected as to give a solution or mixture particularly adaptable for proportional pumps or other measuring devices. The following examples will illustrate this aspect of our invention:

DEMULSIFIER

Example 1

| | Per cent |
|---|---|
| Product of the third stage of oxyethylation of "Oxyalkylated Ester—Example 1" preceding | 60 |
| Xylene | 20 |
| Isopropyl alcohol | 20 |

DEMULSIFIER

Example 2

| | Per cent |
|---|---|
| Product of the third stage of oxyethylation of "Oxyalkylated Ester—Example 1" preceding | 70 |
| Denatured alcohol | 20 |
| Cresylic acid | 10 |

DEMULSIFIER

Example 3

| | Per cent |
|---|---|
| Product of the third stage of oxyethylation of "Oxyalkylated Ester—Example 2" preceding | 70 |
| Aromatic petroleum solvent | 10 |
| Isobutyl alcohol | 10 |
| Acetone | 10 |

DEMULSIFIER

Example 4

| | Per cent |
|---|---|
| Product of the third stage of oxyethylation of "Oxyalkylated Ester—Example 2" preceding | 65 |
| Denatured alcohol | 15 |
| Dichloroethyl ether | 20 |

(The above proportions represent percentage by weight.)

It is to be noted that the oxyalkylated products herein contemplated may be employed as intermediates for the manufacture of more complicated derivatives which may serve for the same uses as the products herein described. Such derivatives are particularly valuable in the treatment of petroleum emulsions, as herein contemplated. Since the final product represents hydroxylated products, usually polyhydroxylated products, obviously the action is possible with a variety of acidic reactants, such as the following: Low molal monocarboxy acids, as exemplified by acetic acid, butyric acid, etc.; low molal hydroxycarboxy acids, as exemplified by hydroxyacetic acid, lactic acid, etc.; low molal alpha-carboxy acids, such as chloroacetic acid, etc.; polycarboxy acids of varying molecular weight, such as maleic acid, phthalic acid, citraconic acid, adipic acid, and particularly the anhydrides thereof, such as phthalic anhydride, maleic anhydride, etc.; higher molal monocarboxy acids, such as higher fatty acids, resin acids, acids obtained by the oxidation of petroleum, etc., and particularly oleic acid, stearic acid, ricinoleic acid, hydroxystearic acid, etc.

Furthermore, what is said in regard to the derivatives immediately preceding, applies with equal force and effect to derivatives obtained by further reaction from such previously described compounds. For instance, products derived from chloroacetic acid or other alpha-chloromonocarboxy acids, can be reacted with tertiary amines, such as pyridine dimethyldecylamine, hydroxylated tertiary amines, or esterified hydroxylated tertiary amines, so as to give quaternary ammonium compounds. Maleic acid derivatives can be reacted with sodium bisulfite to give the corresponding sulfosuccinates. Such maleic compounds can also be reacted so as to give addition products with various unsaturated compounds, particularly olefines and conjugated diolefines.

It is to be noted that the amount of oxyalkylating agent to be employed varies with the particular reactant selected and also the particular pentaerythritol or polypentaerythritol compound being subjected to oxyalkylation. We have obtained valuable products by adding ethylene oxide equal to 1½ times the weight of the ester being subjected to oxyalkylation. The most desirable compounds were obtained when we added two to three times the weight of the ester. In the case of glycide, since it has a greater hydrophile effect on being introduced into the molecule, obviously lesser amounts would be required.

We claim:

1. A process for breaking petroleum emulsions of the water-in-oil type, characterized by subjecting the emulsion to the action of a demulsifier including a hydrophile, hydroxypolyalkoxy compound obtained by the action of an alkylene oxide containing a reactive ethylene oxide ring and having not over four carbon atoms on an artificial wax which consists essentially of the reaction product of stearic acid, maleic anhydride and a polyhydric alcohol selected from the group consisting of pentaerythritol, polypentaerythritols and mixtures thereof, in which the polyhydric alcohol is substantially completely esterified by the acids in the proportion of approximately 0.75 equivalent of stearic acid and approximately 0.25 equivalent of maleic anhydride for each equivalent of the polyhydric alcohol, the amount of alkylene oxide used ranging from about 1½ to about 3 times the amount of the artificial wax, by weight.

2. A process for breaking petroleum emulsions of the water-in-oil type, characterized by subjecting the emulsion to the action of a demulsifier including a hydrophile, hydroxypolyalkoxy compound obtained by the oxyethylation of an artificial wax consisting essentially of the reaction product of stearic acid, maleic anhydride and a polyhydric alcohol selected from the group consisting of pentaerythritol, polypentaerythritols and mixtures thereof, in which the polyhydric alcohol is substantially completely esterified by the acids in the proportion of approximately 0.75 equivalent of stearic acid and approximately 0.25 equivalent of maleic anhydride for each equivalent of the polyhydric alcohol, the amount of ethylene oxide used ranging from about 1½ to about 3 times the amount of the artificial wax, by weight.

3. A process for breaking petroleum emulsions of the water-in-oil type, characterized by subjecting the emulsion to the action of a demulsifier including a hydrophile, hydroxypolyalkoxy compound obtained by the oxyethylation of an artificial wax consisting essentially of the reaction product of stearic acid, maleic anhydride and pentaerythritol, in which the pentaerythritol is substantially completely esterified by the acids in the proportion of approximately 0.75 equivalent of stearic acid and approximately 0.25 equivalent of maleic anhydride for each equivalent of pentaerythritol, the amount of ethylene oxide used ranging from about 1½ to about 3 times the amount of the artificial wax, by weight.

4. A process for breaking petroleum emulsions of the water-in-oil type, characterized by subjecting the emulsion to the action of a demulsifier including a hydrophile, hydroxypolyalkoxy compound obtained by the oxyethylation of an artificial wax consisting essentially of the reaction product of stearic acid, maleic anhydride and dipentaerythritol, in which the dipentaerythritol is substantially completely esterified by the acids in the proportion of approximately 0.75 equivalent of stearic acid and approximately 0.25 equivalent of maleic anhydride for each equivalent of dipentaerythritol, the amount of ethylene oxide used ranging from about 1½ to about 3 times the amount of the artificial wax, by weight.

5. A process for breaking petroleum emulsions of the water-in-oil type, characterized by subjecting the emulsion to the action of a demulsifier including a hydrophile, hydroxypolyalkoxy compound obtained by the oxyethylation of an artificial wax consisting essentially of the reaction product of stearic acid, maleic anhydride and a mixture of pentaerythritol and dipentaerythritol, in which the pentaerythritol and dipentaerythritol are substantially esterified by the acids in the proportion of approximately 0.75 equivalent of stearic acid and approximately 0.25 equivalent of maleic anhydride for each equivalent of the mixture of pentaerythritol and dipentaerythritol, the amount of ethylene oxide used ranging from about 1½ to about 3 times the amount of the artificial wax, by weight.

MELVIN DE GROOTE.
BERNHARD KEISER.

REFERENCES CITED

The following references are of record in the file of this patent:

UNITED STATES PATENTS

| Number | Name | Date |
|---|---|---|
| 2,052,284 | De Groote | Aug. 25, 1936 |
| 2,104,795 | De Groote | Jan. 11, 1938 |
| 2,281,419 | De Groote | Apr. 28, 1942 |
| 2,307,058 | Moeller | Jan. 5, 1943 |